March 26, 1968

R. A. SANFORD ET AL 3,374,659

GAS ANALYSIS

Filed Jan. 22, 1965

INVENTORS
R. A. SANFORD
E. K. CLARDY

BY

*Young & Quigg*
ATTORNEYS

March 26, 1968   R. A. SANFORD ET AL   3,374,659
GAS ANALYSIS
Filed Jan. 22, 1965   4 Sheets-Sheet 2

INVENTORS
R. A. SANFORD
E. K. CLARDY
BY
Young & Quigg
ATTORNEYS

March 26, 1968 R. A. SANFORD ET AL 3,374,659
GAS ANALYSIS
Filed Jan. 22, 1965 4 Sheets-Sheet 3

INVENTORS
R. A. SANFORD
E. K. CLARDY
BY Young & Quigg
ATTORNEYS

United States Patent Office 3,374,659
Patented Mar. 26, 1968

3,374,659
GAS ANALYSIS
Richard A. Sanford and Edwin K. Clardy, Bartlesville, Okla., assignors to Phillips Petroleum Company, a corporation of Delaware
Filed Jan. 22, 1965, Ser. No. 427,251
5 Claims. (Cl. 73—23.1)

ABSTRACT OF THE DISCLOSURE

Overlapping peaks manifested on an analyzing recorder are separated by use of at least two oscillator circuits each having at least one piezoelectric crystal which carries a material that is preferentially sorptive for at least one component present in the stream being analyzed, each material on each crystal being preferential to a different component or components.

This invention relates to a method and apparatus for analyzing vaporizable materials.

Heretofore, in the quantitative and qualitative analysis of a vaporized material wherein each component of the material is gradually separated into a discrete segment in a gaseous stream and at the same time spread out over an increasingly large increment of the gaseous stream, an incomplete separation of components was experienced which caused an overlapping of the segments of the components and an overlapping of peaks manifested on the recorder.

It has now been found that the above overlapping peaks manifested on the recorder can be effectively separated even though in actuality there is still an overlapping of the segments of the components in the gaseous stream by providing at least two oscillator circuits each having at least one piezoelectric crystal which carries a material which is preferentially sorptive for at least one component present in the gaseous stream to be analyzed, each material on each crystal being preferential to a different component or components. The change in frequency of oscillation of each crystal caused by the amount of the component preferentially absorbed is passed through conventional mixing and frequency-to-voltage converter circuits and the voltage is employed to manifest peaks on a recorder which are proportional to the amount of component preferentially absorbed by each crystal. Each peak is substantially distinct from the others and therefore, in effect, separated from the peaks of other components not preferentially absorbed on the crystal to which that peak corresponds.

It has further been found that suitable apparatus for the separation of overlapping peaks produced by the above incomplete separation of the segments of the components is provided by at least two piezoelectric crystals carrying the above-described preferentially sorptive materials each of which is associated with an oscillating circuit, a means for passing a part of the gas to be analyzed over each of the crystals and means for detecting the change in frequency of oscillation of each crystal when it preferentially absorbs a component.

Accordingly, it is an object of this invention to provide a new and improved method of separating overlapping peaks produced in a gas analyzer. It is another object of this invention to provide a new and improved apparatus for the separation of overlapping peaks produced in a gas analyzer.

Other aspects, objects and the several advantages of the invention will be apparent to those skilled in the art from the description, the drawings, and the appended claims.

Figure 1:
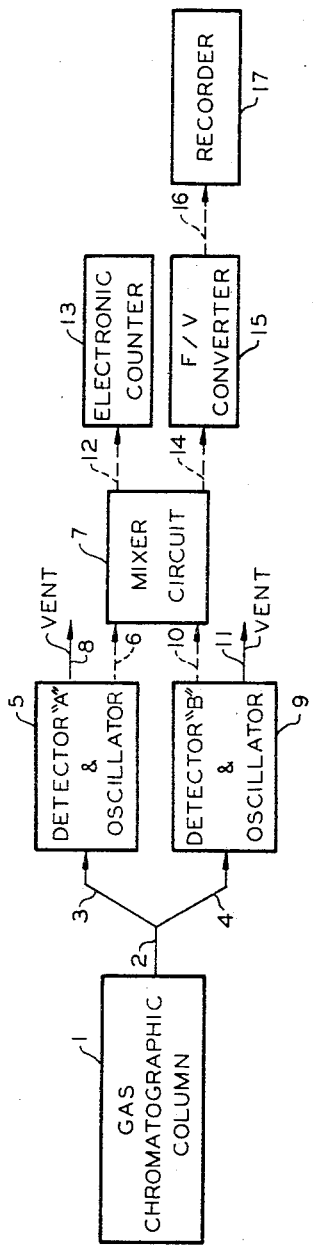
FIGURE 1 is a schematic representation of a system employing this invention.

Referring to FIGURE 1, there is shown a gas chromatographic column 1 which is known in the art and which separates the components of the vaporized material into discrete segments in a gaseous stream and spreads each segment out over an increasingly large increment of the stream. In a conventional column, the segments are sensed by conventional detectors such as a thermistor or other thermal or ionization detectors and transmitted to a recorder which provides a chromatogram on which analytical measurements can be made. The peaks on the chromatogram tend to overlap if the separation of segments of the components in the material is incomplete and therefore these segments overlap at the time they are detected.

The gaseous stream containing overlapping segments of components passes from 1 through 2 and is split into two parts represented by conduits 3 and 4. Part 3 passes through detector-oscillator 5, hereinafter referred to as detector 5, in which there is provided a piezoelectric crystal carrying a material which is preferentially sorptive for at least one component in the gaseous stream and which is oscillating at a normal, nonabsorbing frequency in association with an oscillator circuit as described further below. When the preferential sorptive material on the crystal in detector 5 substantially absorbs a component from the stream, it changes its frequency of oscillation which change is passed by conduit 6 to mixer circuit 7. The gaseous stream leaves detector 5 by vent 8.

When the component absorbed by the material carried by the crystal is no longer present in the gaseous stream the component is desorbed by the gaseous stream and the material readied to absorb another component. Detector-oscillator 9, hereinafter referred to as detector 9, acts as a substantially fixed frequency or reference oscillator against which the output frequency of detector 5 is beat while a peak is being detected by the crystal in 5.

Part 4 of gaseous stream 2 passes to detector 9 in which a similar piezoelectric crystal is oscillating at a normal, nonabsorbing frequency in association with an oscillator circuit. This crystal carries a material which is preferentially sorptive for at least one other component in the gaseous stream which is different from the component or components preferentially absorbed by the material on the crystal in detector 5. The change in frequency of oscillation of the crystal in detector 9 caused by the absorbing of a component is passed by conduit 10 to mixer circuit 7. The gaseous stream leaves 9 by vent 11. Detector 5 serves as the substantially fixed frequency or reference oscillator against which the output frequency of detector 9 is beat while a peak is being detected by the crystal in 9.

Mixer circuit 7 can be of any known and conventional apparatus. A suitable mixer circuit is one in which the output frequency of the crystal in detectors 5 and 9 are beat together in a single circuit to provide a difference frequency which is then passed by conduit 12 to electronic counter 13, and by conduit 14 to frequency-to-voltage converter 15.

Electronic counter 13 counts and registers the frequency output of mixer circuit 7.

The frequency-to-voltage converter which can be of any known and conventional apparatus converts the frequency of the difference signal to a voltage representative of that frequency which voltage is passed by conduit 16 to a recorder 17 which manifests variances in the voltage in the form of peaks of varying height and slope on a graph.

Figure 2:
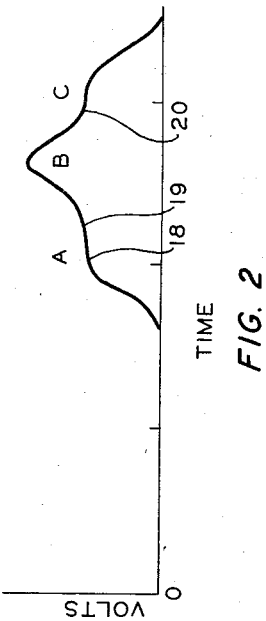
FIGURE 2 represents a thermal conductivity chromatogram that is obtained without the use of this invention.

FIGURE 2 represents a chromatogram which would be obtained if conventional detectors were utilized in conjunction with column 1 in lieu of the crystal detectors of this invention and if the gaseous stream contained three components, A, B and C. FIGURE 2 shows in area 18 that component A is being detected but that before all of component A had been detected component B started to be detected, thus causing an overlapping of peaks, due to the overlapping of segments of components A and B, in area 19. Similarly, overlapping of peaks between components B and C is evident in area 20 which indicates that component C was incipiently detected before all of component B had been detected. Thus, there is an overlapping of peaks which obscures the peaks that would be formed for components A and C and the overlapping deleteriously affects primarily the quantitative, and secondarily the qualitative results of the chromatograph.

Figure 3:
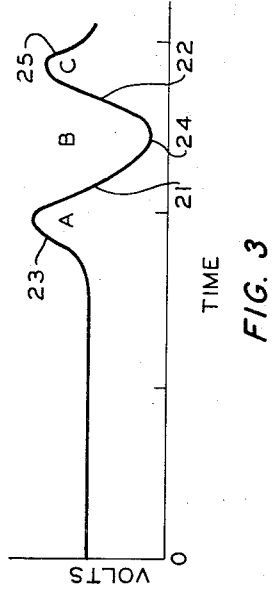
FIGURE 3 is a chromatogram obtained with the use of this invention.

FIGURE 3 shows a chromatogram as manifested on recorder 17 when detectors 5 and 9 are employed in the system of FIGURE 1. By the system of FIGURE 1 the peaks for components A and C are distinctly manifested and therefore in effect separated even though the segments of A, B and C in the gaseous stream overlapped. This is due to the fact that in the areas 21 and 22 of the chromatogram component B was separately detected in detector 9 and separately treated in mixer circuit 7 in a manner described later thereby improving both the quantitative and qualitative results of the chromatogram.

More specifically, in the case of a gaseous stream containing components A, B and C, in that order, the crystal in detector 5 is coated or otherwise carries a material preferentially sorptive for components A and C and is tuned to normally oscillate when not absorbing components A and C at a frequency of, for example 1000 cycles per second. This crystal will, after contact with the gaseous stream from 3, reduce its frequency of oscillation due to the absorption of component A to, for example, 500 cycles per second. This reduced frequency of oscillation is then passed by conduit 6 to mixer circuit 7. Similarly, the crystal in detector 9 will have a coating or otherwise carry a material preferentially sorptive for component B and will be normally oscillating when not absorbing component B at a frequency sufficiently different from that frequency at which the crystal in detector 5 normally oscillates, so that when the crystal in detector 9 absorbs component B and therefore reduces its frequency of oscillation the reduced frequency will not equal the normal frequency of oscillation of the crystal in detector 5. For example, the normal oscillation frequency of the crystal in detector 9 can be 1500 cycles per second while the normal vibration frequency of the crystal detector 5 is 1000 cycles per second. When the crystal in detector 9 absorbs component B its frequency of oscillation will be reduced to, for example, 1300 cycles per second and this reduced frequency is passed by 10 to mixer circuit 7.

In mixer circuit 7 the output frequency from detector 5 is passed through one part of the mixer, for example the base of a transistor, while the output frequency from detector 9 is passed to another part of the oscillator, for example the collector. Thus, the two frequencies from detectors 5 and 9 are beat against one another and produce a difference frequency equal to the difference between the two output frequencies.

Thus, when component A is absorbed by detector 5 a reduction in frequency of oscillation is effected, for example from 1000 to 500 cycles per second, and the reduced frequency is beat against the normal, nonabsorbing frequency of detector 9, for example 1500 cycles per second, since detector 9 does not substantially absorb component A and component B is not yet appearing in the gaseous stream 2. In mixer circuit 7 the difference between 500 cycles per second from detector 5 and 1500 cycles per second from detector 9, i.e. 1000 cycles per second, is passed to frequency-to-voltage converter 15 and therein converted to a representative voltage which voltage is then passed to recorder 17 and recorded thereon as a point on the graph of a peak. This peak represents the voltage output from the frequency-to-voltage converter 15. This variation in voltage is determined by the variation in difference between frequencies beat together in mixer circuit 7 which in turn is caused by variation in the amount of component A absorbed in detector 5. Thus, the change of frequency of oscillation of the crystal in detector 5 while absorbing component A will plot a peak 23 in FIGURE 3.

When component B starts to appear in gaseous stream 2 it will not be substantially absorbed in detector 5 but will be substantially absorbed in detector 9 thereby effecting a reduction in frequency of oscillation of the crystal in detector 9, for example from 1500 cycles per second to 1300 cycles per second. This reduced frequency is against the normal frequency from detector 5. If detector 5 has a normal frequency of 1000 cycles per second the difference frequency will be 300 cycles per second. The mixer output is this difference frequency. Thus, after conversion to the corresponding voltage in converter 15 this difference frequency produces a peak 24 which is opposite in slope to that of peak 23 since its value is 300 cycles per second and the nonabsorbing value at zero time is 500 cycles per second. Therefore peak 24 clearly distinguishes between peak 23 formed by component A and the peak 25 formed by component B. A similar result is achieved when component C starts passing through gaseous stream 2 except that then the crystal in detector 9 returns to its normal frequency of oscillation since it does not substantially absorb component C. The end result then is peak 25 which, due to its reverse slope, clearly distinguishes from peak 24 of component B.

It should be noted that the numerical frequency values used above were picked only for ease of explanation and are not intended to represent realistic values of crystal oscillation.

Figure 4:
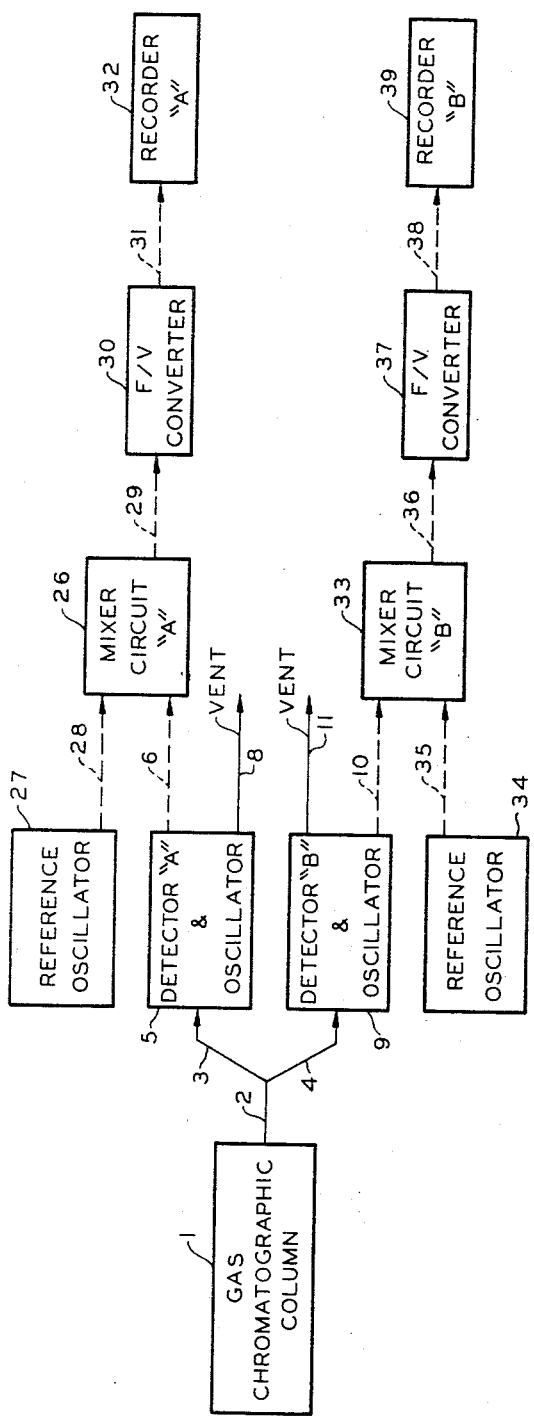
FIGURE 4 is a schematic representation of another system embodying this invention.

FIGURE 4 shows gas chromatographic column 1 from which issues gaseous stream 2 which is split into parts 3 and 4. Part 3 passes to detector 5 and out of same by vent 8. The change in frequency of vibration of the crystal in detector 5 is passed by conduit 6 to mixer circuit 26 and therein beat against a reference frequency produced by an oscillator 27 which frequency is passed by conduit 28 to mixer 26. The difference frequency produced by beating the frequencies from conduit 6 and conduit 28 together passes by conduit 29 to frequency-to-voltage converter 30 and the representative voltage is passed by conduit 31 to recorder 32.

Similarly, part 4 of gaseous stream 2 passes to detector 9 and out of same by vent 11. the change of frequency of oscillation of the crystal in detector 9 passes by conduit 10 to mixer circuit 33 wherein it is beat against a reference frequency from oscillator 34 which passed to mixer circuit 33 by conduit 34. The difference frequency thus produced passes by conduit 36 to frequency-to-voltage converter 37 and then the representative voltage is passed by conduit 38 to a second recorder 39. There is thus produced from this embodiment of the invention two chromatograms instead of one.

Figure 5:
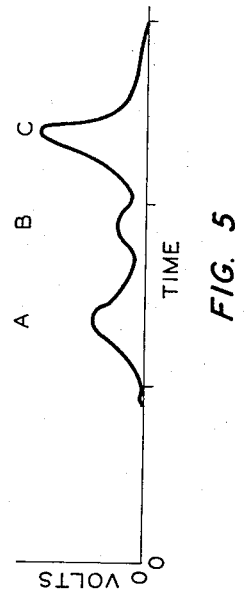

FIGURE 5 represents a chromatogram which would be produced on recorder 32 if, as above, the crystal in detector 5 carried a material preferentially sorptive to components A and C.

Figure 6:
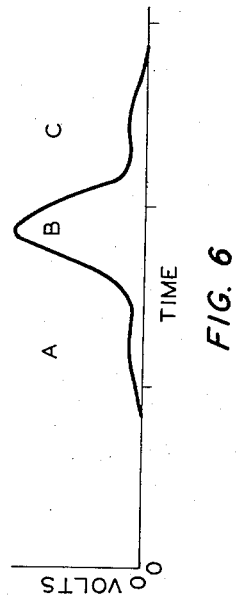
FIGURES 5, 6, 7 and 8 are chromatograms obtained with the use of this invention.

FIGURE 6 represents a chromatogram which would be produced on recorder 39 if, as above, the crystal in detector 9 carried a material which was preferentially sorptive to component B. Thus, by the formation of two separate chromatograms there is effected a separation of peak B from peaks A and C.

This invention also substantially eliminates another problem of analysis produced when a small component peak falls on the "chromatographic tail" of a larger component peak.

Figure 7:
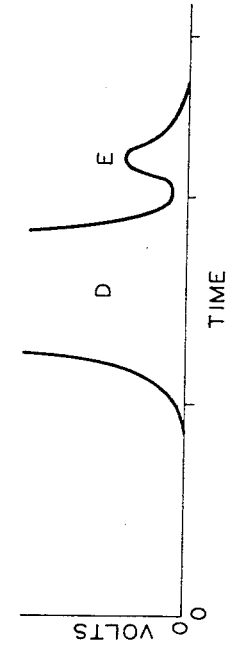

FIGURE 7 shows "chromatographic tail" 40 represented by component E on a larger component peak 41 represented by component D, peak 41 being so large it cannot be completely recorded on the chromatogram and it obscures the relatively smaller peak for component E. The chromatogram of FIGURE 7 is representative of that which would be achieved by prior methods. Also, in the apparatus of FIGURE 4, if the material on the crystal in detector 5 were preferentially sorptive to component D, FIGURE 7 would be the chromatogram produced on recorder 32.

Figure 8:
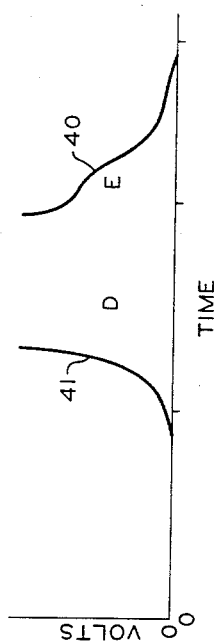

FIGURE 8 represents a chromatogram that would be produced on recorder 39 of FIGURE 4 if the crystal in detector 9 carried a material preferentially sorptive to component E. Thus, it can be seen that this invention effectively separates the peak for component E and thus reduces the difficulty of analysis of the so-called "chromatographic tail."

Figure 9:
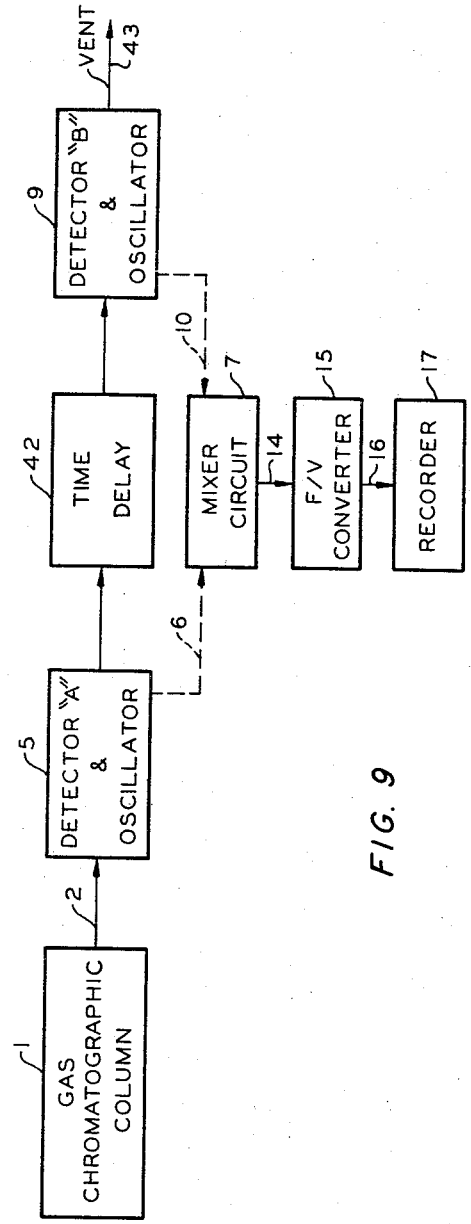
FIGURE 9 is a chromatographic representation of another system embodying this invention.

FIGURE 9 discloses yet another embodiment of this invention wherein the gaseous stream passes from gas chromatographic column 1 through 2 to detector 5 and from there through a time delay means 42 to detector 9 and out of detector 9 through vent 43. The frequency of oscillation of the crystals in detectors 5 and 9 are passed by conduits 6 and 10, respectively, to mixer circuit 7 and then by conduit 14 to frequency-to-voltage converter 15 and then by conduit 16 to recorder 17.

In the embodiment of FIGURE 9 if detector 5 preferentially absorbs component A from gaseous stream 2 the frequency of oscillation of the crystal in detector 5 will be reduced and this reduced frequency will be beat against the normal frequency of oscillation of the crystal in detector 9 in mixer circuit 7. Thus, the normal frequency of oscillation of the crystal in detector 9 is used as a reference oscillator much the same as oscillator 27 in FIGURE 4 was used as the reference oscillator for detector 5 of FIGURE 4. Similarly detector 5 will serve as a reference oscillator for detector 9 when component B is present in gaseous stream 2.

By the embodiment of FIGURE 9 time delay means 42 which can be any suitable means, such as a long hollow loop, which will significantly lengthen the time required for the gaseous stream to pass from detector 5 into detector 9, can be adjusted so that no two peaks enter detectors 5 and 9 at the same time unless it is so desired to obtain a difference signal. Thus, completely separate peaks are produced on recorder 17 by adjusting the length of time delay so that only one peak is present in one detector at one time, the alternate detectors then serving as the reference oscillator.

Figure 10:
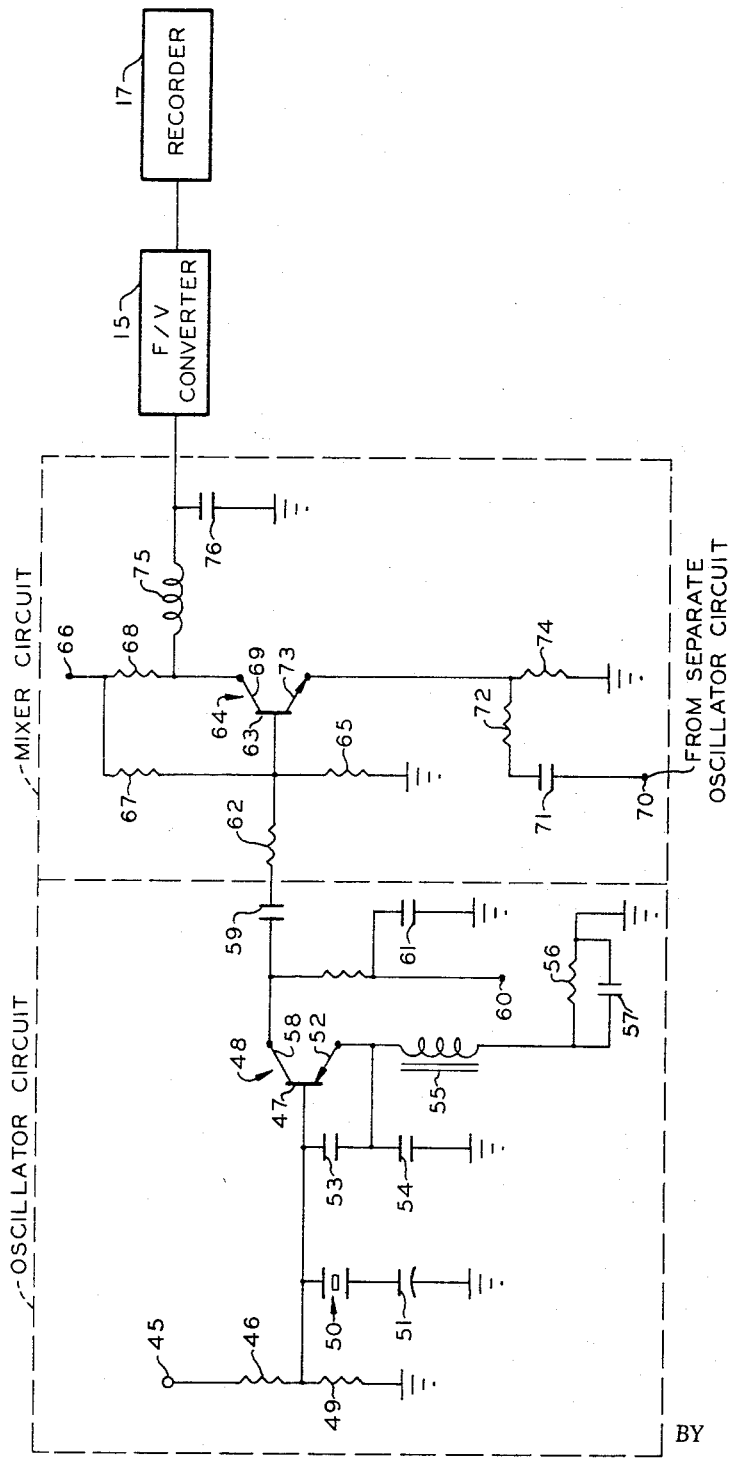
FIGURE 10 is a schematic circuit drawing of the oscillating crystal and related apparatus.

In FIGURE 10 one of many possible and known circuits is shown for carrying out the steps of detecting a component, passing the frequency of oscillation in the crystal in the oscillator circuit to the mixer circuit, beating that frequency against a frequency from a separate oscillator circuit and passing the resulting difference of frequency to a frequency-to-voltage converter and recorder. The oscillator circuit is provided with a potential connected to 45 which is connected through resistor 46 to base 47 of transistor 48 and through resistor 49 to the ground. Piezoelectric crystal 50 which carries the preferentially sorptive material is connected to base 47 of transistor 48 and through capacitor 51 to the ground. Emitter 52 of transistor 48 is connected through capacitor 53 to base 47 of transistor 48 and through capacitor 54 to the ground. Also, emitter 52 of transistor 48 is connected through coil 55 and through resistor 56 which is shunted by capacitor 57 to the ground. Collector 58 of transistor 48 which carries the output frequency of oscillation of crystal 50 passes that frequency through capacitor 59 to the mixer circuit. Collector 58 is also connected to a potential source at 60 and through a resistor and by-pass capacitor 61 to the ground.

The output frequency from the oscillator circuit passes through resistor 62 to base 63 of transistor 64. The input frequency signal is also connected through resistor 65 to the ground. A source of potential 66 is connected through resistor 67 to the base 63 of transistor 64 and also through resistor 68 to collector 69 of transistor 64. Input terminal 70 carries a frequency from a separate oscillator circuit similar to the oscillator circuit shown. This separate oscillator circuit employs a crystal similar to crystal 50 but which carries a material which is preferentially sorptive to components other than those to which the material carried by crystal 50 is preferentially sorptive. The frequency from the separate oscillator circuit passes through capacitor 71 and resistor 72 to emitter 73 of transistor 64. Emitter 73 is also connected to ground via resistor 74. Thus, the frequency from one oscillator circuit passing to base 63 of transistor 64 is beat against the frequency of a separate oscillator circuit passing to a different part of transistor 64, i.e. the emitter 73, and the difference frequency produced travels from collector 69 of transistor 64 through a low pass filter and coil 75 to frequency-to-voltage converter 15 and from there, after being converted to a representative voltage, to recorder 17. The difference frequency signal lead is connected to ground through capacitor 76.

The conversion of the peak for component B as represented by 24 in FIGURE 3 is effected by the connection of one oscillator circuit to base 63 or another suitable part of transistor 64 and the connection of a separate oscillator circuit to emitter 73 or another different suitable part of transistor 64. Thus, for example, if crystal 50 is preferentially sorptive to component A the change in frequency of oscillation caused by the absorption of component A on crystal 50 is passed through base 63 of transistor 64 and beat against another frequency applied at 70 thereby producing a peak 23 in FIGURE 3. Similarly, if the crystal in the separate oscillator circuit is preferentially sorptive to component B the change in frequency of oscillation of that crystal will pass through emitter 73 of transistor 64 and be beat against another frequency from transistor 48 to thereby form a difference frequency and a peak 24 (FIGURE 3) for component B as explained above.

Generally, this invention is applicable to any gas analysis system such as a chromatographic column and the like and can employ any type of piezoelectric crystals such as the well-known quartz, and the like, types. The sizes, shapes and frequencies of the crystals employed can vary widely but generally the size and shape should be such that the frequency is in the range of from about 500 kilocycles to about 200 megacycles, preferably from about 5 megacycles to about 20 megacycles.

The preferential absorption material can be carried on the crystal in any convenient manner but is preferably carried in the form of a liquid or solid coating. Suitable conventional materials can be employed as the sorption material of this invention. For hydrocarbon detection materials such as squalane, silicone oil, apiezon grease, and the like, can be employed. For the detection of aromatic, oxygenated and unsaturated compounds, materials such as polyethylene glycol, sulfolane, dinonyl phthalate, alkyl sulfonate, and the like, can be employed. For the detection of water vapor such materials as silica-gel, alumina, natural resins, synthetic polymer, and the like, can be employed. Other conventional materials which preferentially absorb the above and other materials are numerous and a comprehensive listing is, therefore, not attempted.

Example I

A mixture of hydrocarbons containing approximately equal amounts of n-butane, pentadiene, and n-pentane is injected into a chromatographic column having a carrier gas stream of helium passing therethrough at a rate of 50 to 100 cc./minute. In all, 0.5 cc. of the mixture is injected into the column which employs squalane as absorbent to separate the n-butane, pentadiene and n-pentane into discrete segments and spread each segment out over an increment of the helium stream. Half of the helium stream containing the discrete but somewhat overlapping segments of the above-noted hydrocarbons is passed through a first detector having therein a first piezoelectric quartz crystal having a normal, nonabsorbing frequency of 9.000 megacycles per second and coated with a liquid coating of squalane. The other half of the above helium stream is passed to a second detector containing a second similar piezoelectric quartz crystal having a normal nonabsorbing frequency of 9.001 megacycles per second and a liquid coating of dinonyl phthalate.

The first quartz crystal while oscillating normally at a frequency of 9.000 megacycles per second preferentially absorbs n-butane which is the first component to be detected in the helium stream. Due to this absorption the frequency of oscillation of this first crystal is reduced from the normal 9.000 megacycles per second to a lower frequency which when beat against the normal oscillation frequency of 9.001 megacycles per second of the second crystal produces a peak on the chromatograph of a configuration substantially the same as that of peak 23 of FIGURE 3. The second component to show up in the helium stream is pentadiene which is preferentially absorbed by the second crystal with a reduction of frequency of oscillation of that crystal from the normal 9.001 megacycles per second to a lower frequency which when beat against the normal oscillation frequency of 9.000 megacycles per second of the first crystal produces a peak on the chromatograph similar to that of peak 24 in FIGURE 3. The third component to show up in the helium stream is n-pentane which is preferentially absorbed by the first crystal with a reduction of the frequency of oscillation of that crystal from the normal 9.000 megacycles per second to a lower frequency which when beat against the normal oscillation frequency of the second crystal produces a peak similar to that of peak 25 of FIGURE 3.

Thus, by this invention an improved distinction between the normally overlapping peaks produced in a chromatograph of n-butane, pentadiene and n-pentane is effected.

Example II

A mixture of hydrocarbons containing equal amounts of 2,4-dimethylpentane, toluene and 2,3-dimethylhexane is injected into a chromatographic column and in a manner similar to that of Example I. The first detector has therein a first piezoelectric quartz crystal having a normal, nonabsorbing frequency of 9.000 megacycles per second and is coated with a liquid coating of squalane. The second detector containing a second similar piezoelectric quartz crystal has a normal, nonabsorbing frequency of 9.001 megacycles per second and a liquid coating of β,β'-oxydipropionitrile.

The first quartz crystal while oscillating normally at a frequency of 9.000 megacycles per second preferentially absorbs 2,4-dimethylpentane which is the first component to be detected in the helium stream. Due to this absorption the normal frequency of oscillation of this first crystal is reduced from the normal 9.000 megacycles per second to a lower frequency which when beat against the normal frequency of 9.001 megacycles per second of the second crystal produces a peak on the chromatograph of a configuration substantially the same as that of peak 23 of FIGURE 3. The second component to show up in the helium stream is toluene which is preferentially absorbed by the second crystal with a reduction of frequency of oscillation of that crystal from the normal 9.001 megacycles per second to a lower frequency which when beat against the normal oscillation frequency of 9.000 megacycles per second of the first crystal produces a peak on the chromatograph similar to that of peak 24 in FIGURE 3. The third component to show up in the helium stream is 2,3-dimethylhexane which is preferentially absorbed by the first crystal with a reduction of the frequency of oscillation of that crystal from the normal 9.000 megacycles per second to a lower frequency which when beat against the normal oscillation frequency of the second crystal produces a peak similar to that of peak 25 of FIGURE 3.

Thus, by this invention an improved distinction between the normally overlapping peaks produced in a chromatograph of 2,4-dimethylpentane, toluene and 2,3-dimethylhexane is effected.

Reasonable variations and modifications of this invention are possible within the scope of this disclosure without departing from the spirit and scope of the invention.

We claim:
1. A method of separating overlapping peaks produced in a gas analyzer by incomplete separation of components which comprises preferentially absorbing at least one component from said gas to be analyzed with a piezoelectric crystal carrying material which is preferentially sorptive for said at least one component, thereby changing the frequency of oscillation of said crystal in response to the amount of said at least one component absorbed, preferentially absorbing at least one other component in said gas with at least one other piezoelectric crystal carrying a material preferentially sorptive for said at least one other component, thereby changing the frequency of oscillation of at least one other crystal in response to the amount of said at least one other component absorbed, delaying the time between the preferential absorption of each crystal so that only one crystal absorbs at a time, employing a nonabsorbing crystal as a reference oscillator for the absorbing crystal, beating the frequency of the absorbing crystal against the frequency of the reference oscillator to produce a difference frequency, converting the difference frequency to a corresponding voltage and recording same.

2. A method of separating overlapping peaks produced in a chromatographic column by incomplete separation and therefore overlapping of segments of components in the gas to be analyzed which comprises preferentially absorbing a first component from said gas to be analyzed with a piezoelectric crystal having thereon a liquid coating of a material which is preferentially sorptive for said first component, thereby changing the frequency of oscillation of said crystal in relation to the amount of said first component absorbed, preferentially absorbing a second component in said gas with a second piezoelectric crystal having thereon a liquid coating of a material preferentially sorptive for said second component, thereby changing the frequency of oscillation of said second crystal in relation to the amount of said second component absorbed, beating said change in frequency of oscillation of said first crystal against the normal nonabsorbing frequency of said second crystal to produce a first difference frequency, converting said first difference frequency to a corresponding voltage and recording same, beating said change of frequency of oscillation of said second crystal against the normal nonabsorbing frequency of said first crystal and converting said second difference frequency to a corresponding voltage and recording same.

3. Apparatus for separating overlapping peaks produced in a gas analyzer by incomplete separation of components comprising a first piezoelectric crystal carrying a material preferentially sorptive for at least one component in said gas which varies in frequency of oscillation in response to the amount of said at least one component absorbed, at least one other piezoelectric component carrying a material preferentially sorptive for at least one other component in said gas which varies in frequency of oscillation in response to the amount of said at least one other component absorbed, oscillating means associated with each crystal, conduit means for passing a part of said gas to be analyzed over said crystals, a mixer circuit means connected to the output of said detectors, a frequency-to-voltage converter connected to the output of said mixer circuit and a recorder connected to the output of said converter.

4. Apparatus for separating overlapping peaks which are produced in a gas analyzer by incomplete separation and therefore overlapping of segments of components in the gas to be analyzed comprising a first and a second detector each containing a first and a second crystal which has a coating thereon of a material which is preferentially sorptive for different components in said gas to be analyzed, first and second conduits connecting at least one gas analyzer to said first and second detectors, first and second electrical means connecting the output of said first and second detectors to a single oscillator mixer circuit, a frequency-to-voltage converter, electrical means connecting the output of said mixer circuit to the input of said converter, a recorder, electrical means connecting the output of said converter to the input of said recorder.

5. Apparatus for separating overlapping peaks produced in a gas analyzer by incomplete separation of components comprising a first detector having a first crystal therein with a coating of material thereon preferentially sorptive for at least one component in the gas to be analyzed, a second detector having a second crystal therein with a coating of material thereon preferentially sorptive for at least one component in said gas to be analyzed which is different from said at least one component for which said first crystal is preferentially sorptive, conduit means connecting at least one gas analyzer to said first detector, conduit and time delay means connecting said first detector to said second detector, an oscillator mixer circuit, electrical means connecting the output of said first and second detectors with the input of said mixer circuit, a frequency-to-voltage converter, electrical means connecting the output of said mixer circuit to the input of said converter, a recorder, electrical means connecting the output of said converter with the input of said recorder.

References Cited

UNITED STATES PATENTS

| | | | |
|---|---|---|---|
| 3,164,004 | 1/1965 | King | 73—23 |
| 3,229,501 | 1/1966 | Henze et al. | 73—23.1 |
| 3,260,104 | 7/1966 | King | 73—23 |
| 3,263,488 | 8/1966 | Martin | 73—23.1 |
| 3,266,291 | 8/1966 | King | 73—23 |
| 3,327,519 | 6/1967 | Crawford | 73—23 |

RICHARD C. QUEISSER, *Primary Examiner.*

JAMES GILL, *Examiner.*

CHARLES A. RUEHL, *Assistant Examiner.*